United States Patent [19]

Drouet et al.

[11] 4,435,631

[45] Mar. 6, 1984

[54] METHOD AND DEVICE FOR CONTROLLING THE LENGTH OF AN ELECTRICAL ARC IN AN ARC GENERATING MACHINE

[75] Inventors: Michel G. Drouet, St-Bruno; Francois Nadeau, Montreal, both of Canada

[73] Assignee: Hydro Quebec, Montreal, Canada

[21] Appl. No.: 331,242

[22] Filed: Dec. 15, 1981

[30] Foreign Application Priority Data

May 19, 1981 [CA] Canada ................................. 377808

[51] Int. Cl.³ .............................................. B23K 9/10
[52] U.S. Cl. ............................ 219/124.02; 219/137 R; 373/105
[58] Field of Search ..................... 219/130.01, 130.21, 219/137 PS, 124.02, 124.03, 137 R; 373/104, 105

[56] References Cited

U.S. PATENT DOCUMENTS 3,679,865  7/1972  Jesnitzer et al. ............... 219/130.01
3,989,921  11/1976  Ohi et al. ........................ 219/124.03

FOREIGN PATENT DOCUMENTS 2842496  4/1980  Fed. Rep. of Germany ........................ 219/124.03
1363304  5/1963  France .
1418702  11/1965  France .
2039173  1/1971  France .
2194521  3/1974  France .
2364064  9/1977  France .
1430824  4/1976  United Kingdom .

*Primary Examiner*—C. C. Shaw
*Attorney, Agent, or Firm*—Schwartz, Jeffery, Schwaab, Mack, Blumenthal & Koch

[57] ABSTRACT

In accordance with the method, the arc supplying current is modulated if necessary for generating an acoustical signal. The acoustical signal generated by the arc is detected and its amplitude which, in practice, is a direct function of the actual length of the arc, is compared to a reference amplitude corresponding to the desired length of the electrical arc, in order to determine the algebraic value of their difference. This algebraic value is used for monitoring at least one element of the machine between which the arc forms, and moving this element proportionally to the so-determined algebraic value in order to increase or reduce the actual length of the arc and to bring this length back to the desired length.

14 Claims, 7 Drawing Figures

METHOD AND DEVICE FOR CONTROLLING THE LENGTH OF AN ELECTRICAL ARC IN AN ARC GENERATING MACHINE

BACKGROUND OF THE INVENTION (1) Field of the Invention

The present invention relates to a method for controlling the length of an electrical arc in an arc generating machine such as an arc furnace, a gas-tungsten arc welding machine, with or without pulsed current (TIG machines), a gas-metal arc welding machine (GMAW machines) or an arc lamp with or without additional metal wire feeding.

The present invention also relates to a device for practicing the above-mentioned method.

(2) Description of Related Art

In the field of arc furnaces and arc welding machines, it is known that the electrical power fed to the arc column is a function of the length of the arc. Accordingly, in order to obtain good results when using an arc operating machine such as an arc furnace, an arc welder or an arc lamp, it is compulsory to adjust and control the distance separating the elements of the machine between which the arc forms. This control is particularly essential when one or both of these elements are eroded during operation of the machine.

In the particular case of an arc furnace, it is compulsory to maintain the length of the arc at its optimal operating value by maintaining the distance between the electrode(s) and the metal bath constant especially when the electrode(s) is or are mobile and have to be moved to compensate for the erosion of their tips, in order to keep as constant as possible the need of electrical power necessary for supplying the arc, to reduce as much as possible the erosion of the tips of the electrodes and to reduce as much as possible the erosion of the refractory material of the furnace.

Similarly, in the case of an arc welder, it is compulsory to control in a permanent manner the distance between the electrodes or the electrode and the metal part to be welded since the quality and regularity of the welding depends directly on this distance.

In order to ensure this necessary control of the length of the electrical arc in operating machines it has been proposed up to now to measure the arc voltage drop, since it is known that its value is a function of the length of the arc, and to monitor at least one of the electrodes of the arc operating machine to keep this value constant.

For measuring the arc voltage drop, an electrical voltage probe is usually connected to the power supply of the arc in the vicinity of the ends of the arc by means of wires. This method which thus involves the creation of a measuring loop in the power supply line for the arc, has several major drawbacks. Among these drawbacks, it should first be mentioned that the electrical voltage probe is never electrically insulated from the arc power supply. This results in very sharp problems when the arc generating machine is operating at high voltage or when the arc supplying current is floating. As another major drawback, it should also be mentioned that the measuring loop is subject to parasitic voltages induced in the loop in particular when the arc current undergoes high variation.

Another major drawback of the conventional method used up to now is the difficulty of obtaining an exact value of the arc voltage drop, as the value obtained with the measuring loop is, in fact, the sum of the following voltage drops:

(1) the actual, arc column voltage drop;

(2) the anode and cathode voltage drop;

(3) the ohmic drop in the electrode and in the part of the supply circuit included in the measurement loop;

(4) the induced voltages due to mutual inductance between the phases of the current in a three phase current supply circuit when, for example, the measuring loop is used in an industrial arc furnace; and (5) the parasitic voltages induced in the measurement loop.

All these voltage drops, except the arc column voltage drop which is a function of the arc length, are very difficult to measure and/or determine and therefore it is almost impossible to isolate the arc column voltage drop from the value obtained with the measuring loop since this value is often a small fraction of the total measured voltage.

In the particular field of arc furnaces and arc welding machines, it is also known that the arc formed between the electrode elements of the machine produces an audible, acoustical signal when the machine is supplied with an AC or modulated current. It is also known that the amplitude of the acoustical signal generated by the arc is proportional to the time derivative of the power fed to the arc column.

From this theoretical knowledge, it has already been proposed to use the detected value of the amplitude of the acoustical signal generated by the arc for controlling some parameters of an arc-welding operation.

By way of example, British Pat. No. 1,430,824 published on Apr. 4, 1976, in the name of the Japanese firm Mitsui Ship Building and Engineering Co. Ltd. discloses a method for controlling the operation of an arc welding machine by measuring the intensity of the sound generated by the arc, detecting any abnormal variation in the intensity of the so measured sound and acting on some welding characteristics of the welding machine in response to the so detected abnormal sound. The parameters mentioned in this British Patent as being possibly controllable by measuring the intenstiy of the acoustical signal generated by the arc column are the welding speed, that is the speed at which the electrode moves in translation with respect to the piece of metal to be welded, the plasma gas flow when use is made of a plasma welding machine, the intensity of the welding current and the metal wire feed speed.

This British Patent which is concerned much more with a very broad, theoretical principle than with a practical embodiment of this principle, does not mention that use can be made of the acoustical signal generated by the arc for controlling the length of this arc, although this is an essential condition for obtaining a good weld.

This patent does not mention either that use can also be made of the acoustical signal generated by the arc column for controlling the operation of a continuous or three-phase current arc furnace. On the contrary, this patent makes reference only to arc welding machines or lamps.

Last of all, it should be noted that this British Patent suggests the detection of the intensity of the sound generated by the arc column only for detecting and correcting the anomalies of operation occurring during the welding operation. This patent does not mention that use can be made of the sound generated by the arc column for controlling the arc generating machine in a permanent and positive manner.

SUMMARY OF THE INVENTION

The present invention is based on the discovery that if the amplitude of the acoustical signal generated by an arc column is directly proportional to the time derivative of the electrical power fed in this arc column and if the electrical power fed in the arc column is a function of the length of this arc, then the amplitude of the acoustical signal generated by the arc column is also a function of the length of the arc column. Therefore, it appears that the length of the arc, which is an essential parameter to make any arc generating machine operative in a positive manner, can be controlled by measuring the amplitude of the acoustical signal generated by the arc when the machine is in operation, and by using the so detected value for monitoring at least one of the elements between which the arc forms.

Indeed, as the amplitude of the acoustical signal generated by the arc which is itself generated by a modulated or AC electrical current, is a function of the length of the arc, any variation in the length of the arc for a given intensity of current will actually result in a corresponding variation of the amplitude of the acoustical signal produced by the arc column. For controlling the length of the electrical arc, it is therefore sufficient to detect the acoustical signal generated by the arc, to compare the so detected signal to a reference signal, and to use the algebraic value of the difference between the two signals for increasing or reducing the length of the arc by monitoring at least one of the two elements between which the arc forms.

Therefore, the present invention proposes a method for controlling a length of an electrical arc generated between the two elements in an arc generating machine, comprising the steps of:

modulating the arc generating current if necessary for generating an acoustical signal;

detecting the acoustical signal generated by the arc;

comparing the amplitude of the so detected signal which, in practice, is a direct function of the actual length of the arc, with a reference amplitude corresponding to a desired length of the arc, to determine the algebraic value of their difference; and monitoring at least one of the elements of the machine between which the arc forms to move said at least one element proportionally to the so determined algebraic value, whereby the actual length of the arc is increased or reduced and brought back to the desired length.

Advantageously, the above-described method can be adapted in a very simple manner to any kind of arc generating machine.

In particular, the method according to the invention can be used for controlling the length of an electrical arc generated between the electrode and the bath in an arc furnace supplied with the DC current. As an arc column generated by a DC current does not emit any acoustical signal, it is necessary in this case to modulate the arc column supplying current for generating an acoustical signal. This acoustical signal is detected and filtered at its basic frequency which is equal to the frequency of the modulation. The amplitude of the filtered signal is then compared to an adjustable reference amplitude corresponding to a desired length of the electrical arc column. This comparison permits a determination of the algebraic value of the difference between the two signals and the production of a continuous electrical signal proportional to this algebraic value. Then, the so produced electrical signal is supplied to a device for moving the electrode with respect to the bath until the actual length of the arc column is equal to the desired length.

It should be noted that the same method as above can be used for controlling the length of an electrical arc generated between the electrode and the piece to be welded in a gas tungsten or gas metal arc welding machine (also known as "automatic, TIG or GMAW machines").

The method according to the invention can also be used in a very advantageous manner for simultaneously controlling the respective lengths of the electric arcs generated between the three electrodes and the bath of a three phase current arc furnace. In this case, the acoustical signal naturally generated by the arcs is detected at an equal distance from the three electrodes and is filtered at a first frequency which is equal to six times the basic frequency of the three phase currents. The amplitude of the acoustical signal filtered at this first frequency is compared to an adjustable reference amplitude corresponding to a desired, common length of the three arcs to determine the algebraic value of their difference and to produce a continuous electrical signal proportional to this algebraic value. The so produced, continuous electrical signal is then supplied simultaneously to three independent devices respectively associated with the three electrodes, for simultaneously moving the electrodes altogether with respect to the bath until their actual common length is equal to the desired length.

Simultaneously to the first filtering, the detected acoustical signal can be filtered at a second frequency equal to twice the value of the basic frequency of the three phase current. The phase of the signal filtered at the second frequency is then compared to each of the phases of the three phase current to determine the algebraic value of the differences between the phase of the filtered signal and each of the phases of the three phase current and to separately produce three continuous and distinct, electrical signals proportional to the respective algebraic values of the differences between the phase of the filtered signal and the phase of the three phase currents. By supplying the electrical signals produced separately to the three moving devices respectively associated with the three electrodes of the arc furnace, the electrode in one given phase is compared to the electrical signal produced for the same phase and is moved separately from the other electrodes with respect to the bath until the length of its arc is equal to the length of the arcs of the other electrodes and accordingly to the desired common length of the three arcs.

It should be noted that the method described hereinabove for use in a three phase current arc furnace, is particularly interesting since, the method presently used for simultaneously controlling the three electrodes of such an arc furnace consists in resolving a plurality of differential equations that are rather complicated, while taking into account the ohmic drop that is very difficult to determine in practice and the measured values of the voltages at the extremities of each electrode. This calculation is not only inaccurate but also requires a long time to be carried out even when using a computer. This, of course, is particularly cumbersome as the length of the arc columns between the three electrodes and the bath must, in practice, be monitored and controlled instantaneously.

The method according to the present invention can also be used for controlling the length of the electrical arc generated between an electrode and a piece to be welded in a gas-tungsten or gas-metal arc welding machine operating under AC current or in a gas-tungsten arc welding machine operating under pulsed current. When a machine operating under pulsed current is used, it is not necessary to modulate the current since there exists a natural variation of the currents due to the current pulses. However, it is necessary to take into account the possible manual adjustment of the frequency and amplitude of the pulses. For this purpose, instead of simply filtering the acoustical signal detected by a microphone, an integrator is used for integrating the amplitude of the acoustical signal for each pulse. The so integrated signal is subsequently divided by a value proportional to the amplitude of the pulse. This double operation of integration and division advantageously takes into account any variation of the frequency and/or intensity of the pulse due to a manual adjustment made by the operator.

Last of all, the method of the invention can be used for controlling the length of the electrical arc generated between an electrode and a piece to be welded in a gas-tungsten arc welding machine operating under AC or DC current with additional metal wire feeding. In this case, simultaneously to the filtering carried out at the basic frequency of the acoustical signal, all the sounds made by the metal droplets falling from the metal wire to the piece to be welded are detected with an electrical threshold device. The frequency of the so detected sounds is compared to an adjustable reference frequency corresponding to the projection of a given number of droplets in order to determine the algebraic value of their difference and to produce a continuous electrical signal proportional to the algebraic value. The so obtained continuous electrical signal is subsequently supplied to a device for moving the metal wire with respect to the arc until the actual frequency at which the droplets of metal are projected corresponds to the desired frequency.

Of course, the invention also proposes a device for carrying out the method according to the invention, and a plurality of more specific devices especially adapted to the very particular applications listed hereinabove.

BRIEF DESCRIPTION OF THE DRAWINGS

Various applications of the method according to the invention and their advantages will be better understood with reference to the following nonrestrictive description of several preferred embodiments of the present invention, taken in connection with the accompanying drawings in which.

As explained hereinabove, the present invention is based on the discovery that the acoustical signal generated by an arc is a function of the length of its column and that accordingly, the length of the arc column which is an essential parameter to make any arc generating machine operative in a positive manner, can easily be controlled by measuring the amplitude of the acoustical signal generated by the arc when the machine is in operation and by using the so detected signal for monitoring at least one of the elements between which the arc is formed.

Figure 1:
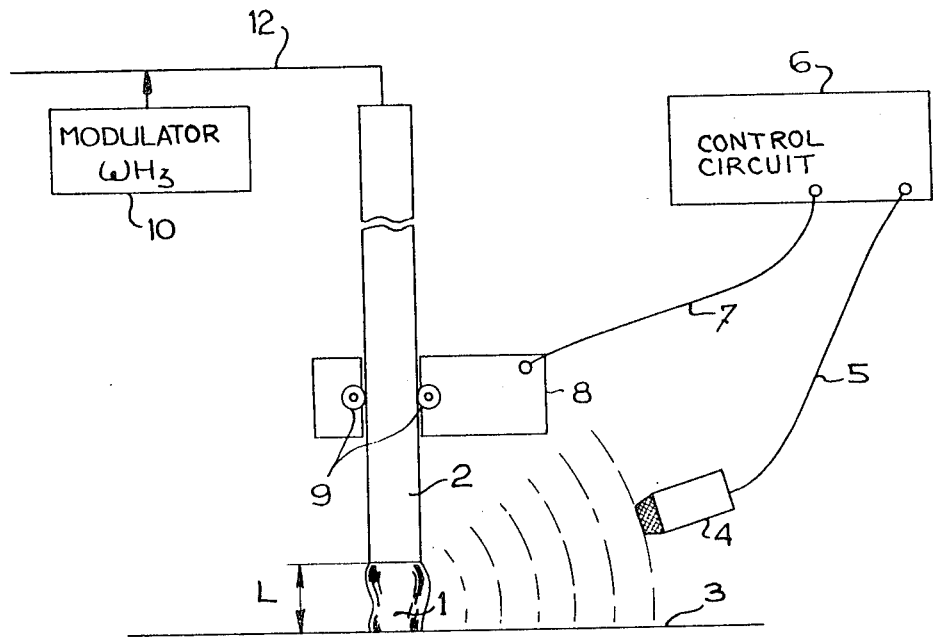
FIG. 1 is a schematic perspective view of an arc furnace supplied with DC current and provided with an arc length control device according to the present invention.
Figure 4:
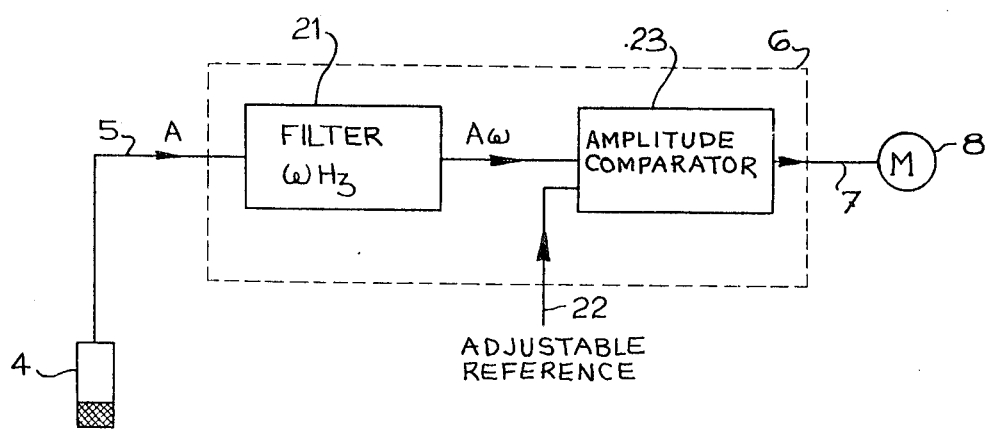
FIG. 4 is a diagram of the electrical control circuit used in the arc furnace supplied with DC current as shown in FIG. 1.

The general principle on which the method according to the invention is based, can easily be understood with reference to FIGS. 1 and 4 which represent, respectively, in schematic manner, an arc furnace operating under DC current and provided with a device according to the present invention for controlling the length of the arc and an example of electrical circuit that can be used for such a control.

The arc furnace shown on FIG. 1 comprises an electrode 2 extending perpendicularly over a liquid bath 3. The electrode 2 and the bath 3 are both connected to the terminals of a DC current source whose intensity is sufficient to form an electrical arc 1 having a length L between the lower end of the electrode 2 and the surface of the bath 3. To reduce into practice the control method according to the invention, the DC current supplying the arc furnace must be modulated at a given frequency w for generating an acoustical signal, since it is known that an electrical arc supplied with DC current does not generate sonorous waves. For generating an acoustical signal, a modulator 10 that can be mounted on the supply wire 12 of the electrode 2 is used to produce a very slight modulation of the current at a frequency equal to w and thus to permit to the arc 1 to generate an acoustical signal.

According to the invention, the acoustical signal (shown in FIG. 1 by means of concentrical circle segments printed in dotted lines) is detected by a microphone 4 or any similar acoustical detector. The so detected signal is transmitted via a wire 5 to a control circuit 6 whose structure is shown in detail in FIG. 4. The control circuit 6 first comprises a filter 21 for filtering the acoustical signal detected by the microphone 4 at its fundamental frequency which is equal to the value of the modulation frequency w. The control circuit 6 also comprises an amplitude comparator 23 mounted below the filter 21 for comparing the amplitude of the acoustical signal filtered by filter 21 with an adjustable reference amplitude 22 corresponding to a desired length of the arc column in order to determine the algebraic value of their difference and to produce a continuous electrical signal proportional to this algebraic value. This amplitude comparator 23 can be, by way of example, a differential amplifier fed by the signal coming from the filter 21 and by the reference signal 22 whose amplitude can be adjusted by means of a variable resistance adjustable as a function of the desired length of the arc 1. The continuous electrical signal which is produced by the comparator 23 and which is proportional to the algebric value of the difference between the signal coming from the filter 21 and the reference signal 22 is then transmitted via a wire 7 to a device 8 for moving the electrode 2. The device 8 can consist of a DC motor operating a plurality of rollers 9 for moving the electrode 2 vertically in one or the other direction.

As can easily be understood, the moving device is supplied by the control circuit and thus operated only when the comparator 23 produces an electrical signal or, in other words, when this comparator notes a difference between the signal coming from the filter 21 and the reference signal 22. Indeed, it is quite obvious that when the signal coming from the filter 21 is equal to the signal 22 which itself corresponds to a desired length of the arc, the device 8 does not operate as the actual length L of the arc 1 corresponds to the desired length. However, if the device 8 receives a positive or negative signal from the control circuit, it automatically moves the electrode proportionally to the algebraic value determined by this control circuit for increasing or reducing the actual length of the arc according to the algebraic sign of the signal and thus to increase or reduce the actual length of the arc until it is brought back to the desired length. Of course, this is performed in an automatic manner and it can therefore easily be understood that this control device is particularly suitable for keeping the arc length substantially constant even in the case of an arc furnace in which the electrode 2 burns during operation.

It should be noted that a control device having a structure substantially identical to that previously described can also be used for controlling the length of the electrical arc generated between the electrode and the piece to be welded in a gas-tungsten or gas-metal, arc welding machine operating under DC current. In this case indeed, the supplied current must be slightly modulated to generate an acoustical signal. This acoustical signal can then be detected with a microphone located at the neighborhood of the arc and the so detected acoustical signal can be used for controlling the electrode of the arc welding machine according to the value of the difference between the acoustical signal filtered at its modulation frequency and an adjustable reference signal corresponding to a desired length of the arc.

The control method described hereinabove in a general manner can very advantageously be used in a three phase current arc furnace.

Figure 2:
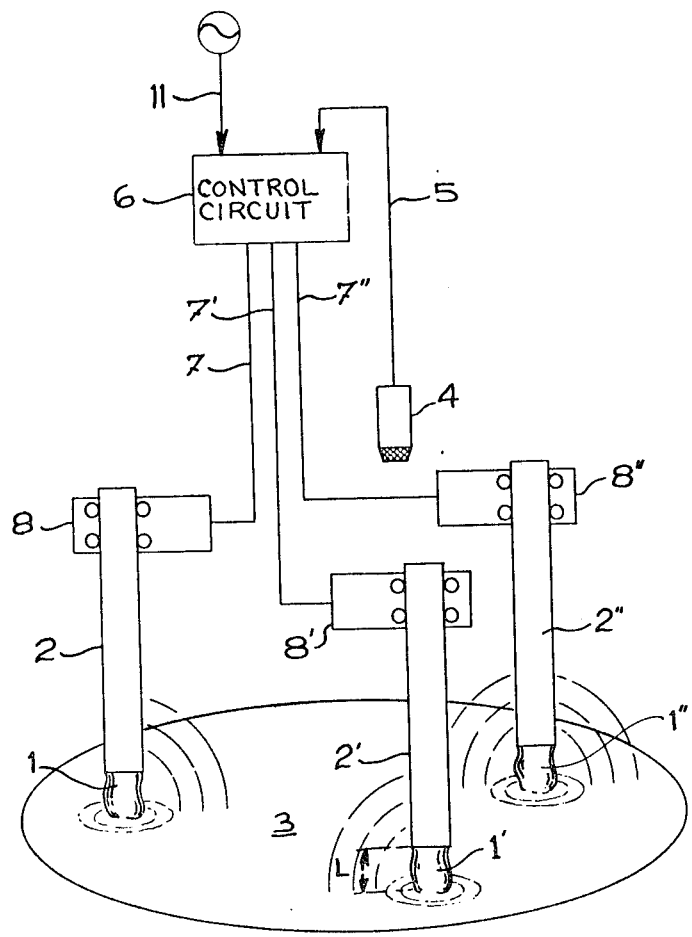
FIG. 2 is a schematic perspective view of an arc furnace supplied with a three phase current and in which the length of each arc column is controlled with a device according to the present invention.

As schematically shown on FIG. 2, a three phase current arc furnace comprises three electrodes 2, 2' and 2'' generally made of carbon and extending perpendicularly over a liquid bath 3 which acts as common ground for the three arcs 1, 1' and 1'' generated between the three electrodes and the bath. This kind of arc furnace is of course supplied with a three phase current, each electrode being associated with one phase of the current. Assuming that the frequency of the supplying current is 60 hertz, one can see that each arc 1, 1' or 1'' generates an acoustical signal having a frequency of 120 hertz and whose phase is shifted by 120° with respect to the phase of the signal generated by the two other electrical arcs. The fact that each acoustical signal has a frequency of 120 hertz can easily be understood when noting that, at every half period of the alternating current, each arc generates a pressure wave whose amplitude varies only as a function of the voltage of the arc or of the length thereof as the amplitude of the current is constant by definition. Thus the corresponding acoustical signal has a frequency corresponding to twice the frequency of the alternating current, and an amplitude which, as that of the pressure waves, varies only with the voltage of the arc, or the length of the arc.

In order to control the length of the arc formed between each electrode and the bath 3, it is necessary to place a microphone over the bath at substantially equal distance from the three electrodes 2, 2' and 2''. The acoustical signal detected by this microphone is transmitted via a wire 5 to the control circuit 6 where it is filtered at a frequency of 120 hertz by means of a filter 24. In normal operation, when the lengths of the arcs 1, 1' and 1'' are identical, the three components of the acoustical signal detected at this frequency are identical and, as these three components are respectively shifted by 120° with respect to each other, their sum is equal to 0. When the signal filtered 120 hertz by the filter 24 is not equal to 0, this means that at least one of the arcs is not of the same length as the others. Moreover, as the acoustical signal strength of each component is a function of the length of the respective arc, it is obvious that when the difference between the components of the acoustical signal at 120 hertz is high, the difference between the lengths of the arcs of the respective electrodes is great.

To determine which arc or arcs are of a different length with respect to the others, the signal filtered at 120 hertz by the filter 21 is supplied to a phase comparator 25 comprising three gates 26, 26' and 26'' for comparing the phase of the acoustical signal filtered at 120 hertz with each of the phases of the three phase current 11. Each gate 26, 26' and 26'' produces a signal which is the algebraic value of the difference between the phase of the filtered signal and each of the phases of the three phase current. Three low pass filters 27, 27' and 27'' receive these signals and produce, respectively, three continuous and distinct electrical signals which are respectively functions of the algebraic values of the differences between the phase of the filtered signal and each of the phases of the three phased current. If, by way of example, the arc 1 generated between the electrode 2 and the bath 3 is too short, the component at 120 hertz in phase with the electrode 2 will be reduced and the filter 24 will give a signal proportional to the variation of the length of the arc, whose phase will be shifted by 180° with respect to the phase of the electrode 2. The so shifted signal will then be supplied to the three gates 26, 26', 26'' which will each emit an electrical signal rectified by the low pass filters 27, 27' and 27'' respectively. Assuming as above that the length of the arc 1 between the electrode 2 and the bath 3 is too short, the continuous signal that will be transmitted by the filter 27 will be negative while the signals transmitted by the filter 27' and 27'' will be positive. The three positive and negative signals produced by the phase comparator 25 will then be transmitted separately by wires 7, 7' and 7'' to three devices 8, 8' and 8'' independent from each other but respectively associated with the three electrodes 2, 2' and 2'' of the furnace, and move them.

As can now be easily understood, as soon as the length of the arc generated by the electrode supplied in one given phase and the bath is different from the length of the other arcs, the acoustical signal filtered at 120 hertz will automatically act via the comparator 25 on the three devices 8, 8' and 8'' for independently moving the electrodes with respect to each other until the lengths of their arcs become again equal to each other.

To ensure a control of the desired common length of the three arcs, 1, 1' and 1", of the arc furnace shown in FIG. 2, the acoustical signal detected by the microphone 4 is filtered at the basic frequency which, if the three arcs are the same length, is equal to six times the frequency of the three phase current, that is 360 hertz. At this frequency, the detected signal indeed is equal to the sum of the three phase signal emitted by the arcs formed between the three electrodes 2, 2' and 2" and the bath 3.

Figure 5:
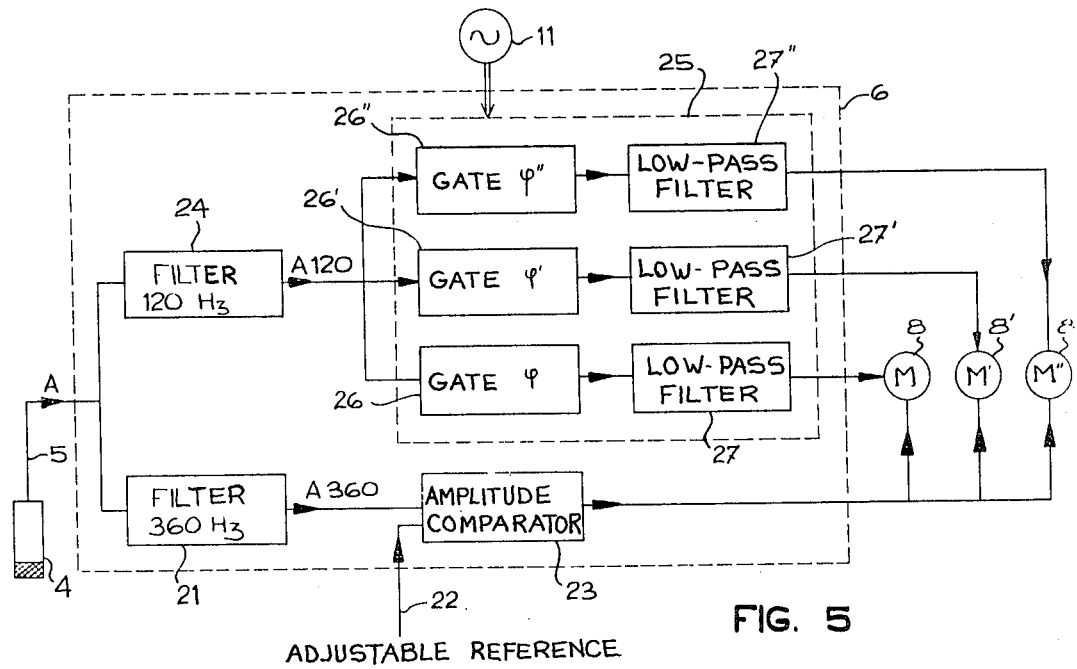
FIG. 5 is a diagram of the electrical control circuit used with the three phase current arc furnace as shown on FIG. 2.

Referring again to FIG. 5, the acoustical signal detected by the microphone 4 at the frequency of 360 hertz is filtered with a filter 21 and the so filtered signal is supplied to a comparator 23 in which the amplitude of the so filtered acoustical signal 360 hertz is compared to a reference amplitude 22 which corresponds to a desired length of the three arcs of the furnace. The amplitude comparator 23 determines the algebraic value of the difference between the signal filtered at 360 hertz by the filter 21 and the reference signal 22 and produces a continuous electrical signal proportional to this algebraic value. This continuous electrical signal is then supplied simultaneously to the three devices 8, 8' and 8" for moving the three electrodes 2, 2' and 2" altogether with respect to the bath until the actual common length of the arcs is brought back to the desired value.

As can therefore be understood, the device according to the present invention permits control in a very simple manner of not only the common length of the three arcs of the furnace so that this common length corresponds to a desired length, but also of the length of each arc with respect to the others, which correction has apparently never been done up to now. Moreover, the method according to the invention also permits the immediate detection of an arc which is formed between the electrodes and the walls of the furnace instead of the bath when, for example, the refractory material of these walls is worn. In this case, the acoustical signal will vary in a substantial manner and will immediately lead the control device to correct the lengths of the arcs.

As described hereinabove, the method according to the invention can be applied not only to an arc furnace but also to any kind of arc welding machine, for controlling the length of the electrical arc generated between the electrode of the machine and the place to be welded.

Thus, the method according to the invention can be used in an arc welding machine operating under continuous or alternating current, of the gas-tungsten type, in lieu of the voltage control system used up to now and known under the name of AVC (arc voltage control). Of course, when the supplied current is continuous, it is necessary to slightly modulate this current to generate an acoustical signal and to filter the acoustical signal detected at the frequency of modulation before comparing its amplitude to an adjustable reference amplitude corresponding to the desired length of arc. When the current is alternating, the acoustical signal naturally generated by the arc will be filtered at twice the value of the frequency of the current before comparing its amplitude to an adjustable reference amplitude corresponding to the desired length of the arc. In both cases, the sensitivity of the control obtained in accordance with the present invention is substantially improved as compared to the AVC system, since the acoustical signal is proportional only to the length of arc and therefore to the drop of voltage in this arc, and does not take into account the voltage drop at the extremities of the electrodes as is presently done by the AVC system.

In a similar manner, the method according to the present invention can be used in a gas-metal, arc welding machine for controlling of the length of the arc and accordingly the quality of the weld independently of the deposition of the metal or the choice of the supply current that can be either at constant voltage or constant intensity.

The method according to the invention can also be used for controlling the length of an electrical arc generated between the electrode and the piece to be welded in a gas-tungsten, arc welding machine operating under pulsed current. In this case, the fact that the length of the arc may be controlled by the method according to the invention is a substantial improvement over the state of the art, since the AVC control system used up to now cannot be used with this kind of apparatus whose frequency and intensity of the pulsed current is usually adjustable by the operator.

In order to apply the method according to the invention to such an arc welding machine operating under pulsed current, it is not necessary to modulate the current for generating an acoustical signal since there is a natural variation of this current because of the pulsation of the current and therefore generation of an acoustical signal by the arc. However, as the frequency and intensity of the pulsed current are and must be adjustable, use cannot be made of the very simple control device described hereinabove for use in a gas-metal or gas-tungsten arc welding machines.

Figure 6:
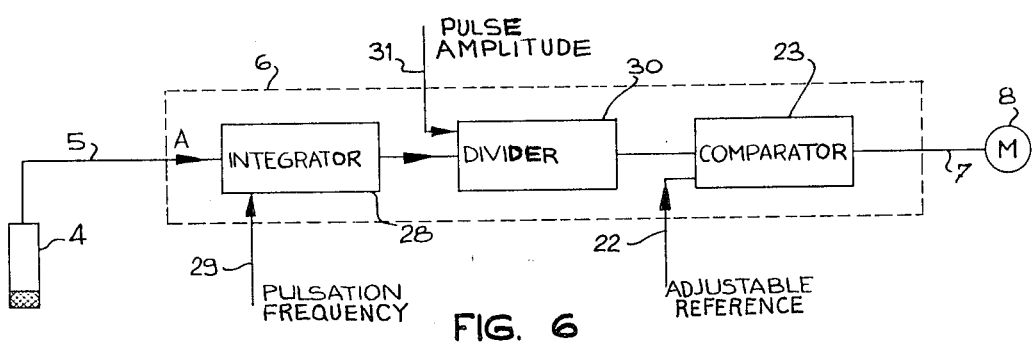
FIG. 6 is a diagram of the electrical control circuit that can be used with an arc welding machine operating under a pulsed current.

Indeed, it is necessary to use an electrical circuit different from those presently described to take into account the possible adjustment of the pulses. This different circuit is illustrated on FIG. 6.

In this circuit, the acoustical signal detected by the microphone 4 is supplied to an integrator 28 provided with an automatic reset device monitored by the system controlling the frequency of the pulses 29. The integrator 28 integrates the amplitude of the acoustical signal detected during each pulse and transmits this integrated value to a divider 30 in which the so integrated signal is divided by a value proportional to the amplitude of the pulse 31 whose intensity is also adjustable by the operator or the machine. This double operation of integration and division which is compensated for the adjustable frequency and amplitude of the pulse, gives an integrated signal which, after having been divided, is independent of the adjustment of the pulse and therefore can be compared to an adjustable reference signal corresponding to a desired length of the arc 22 by means of a comparator 23 for determining the algebraic value of their difference and producing a continuous electrical signal proportional to this algebraic value. This electrical signal is then supplied via a wire 7 to a device 8 for moving the electrode of the machine with respect to the piece to be welded until the length of the arc is brought back to its desired value.

Figure 3:
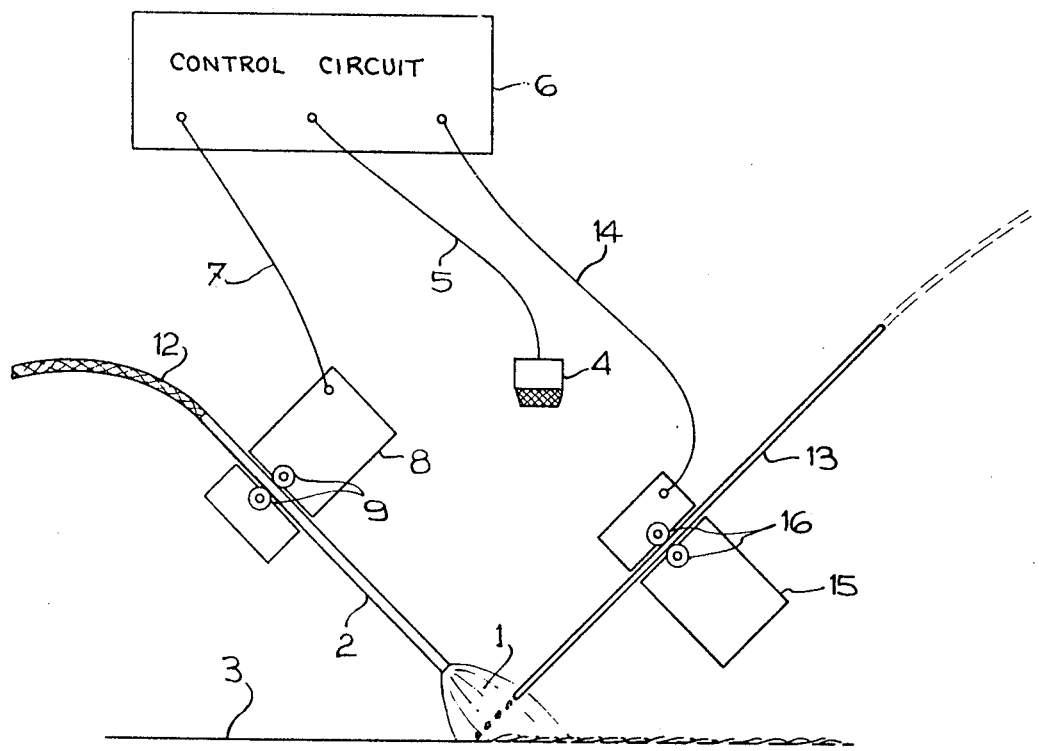
FIG. 3 is a schematic side elevational view of a gas-tungsten arc welding machine operating with metal wire feeding and in which the length of the arc and the feeding of the metal wire are both controlled with a device according to the present invention.

Last of all, the method according to the present invention can advantageously be used for controlling the length of the electrical arc generated between the electrode and the piece to be welded in a continuous or alternating current arc welding machine of the gas-tungsten type, operating with additional metal wire feeding. In this case, as in the above-mentioned case, it is necessary to slightly modulate the current if this current is continuous. An arc welding machine of this type is shown in FIG. 3 and its electrical control circuit is illustrated in FIG. 7.

As can be understood, this kind of machine comprises an electrode 2 adjacent to the piece to be welded 3 and kept under voltage so that an electric arc 1 may form between the electrode and the piece to be welded. A wire 13 melts in droplets under the heat of the arc issued for supplying the metal necessary to complete the welding of the piece 3.

Figure 7:
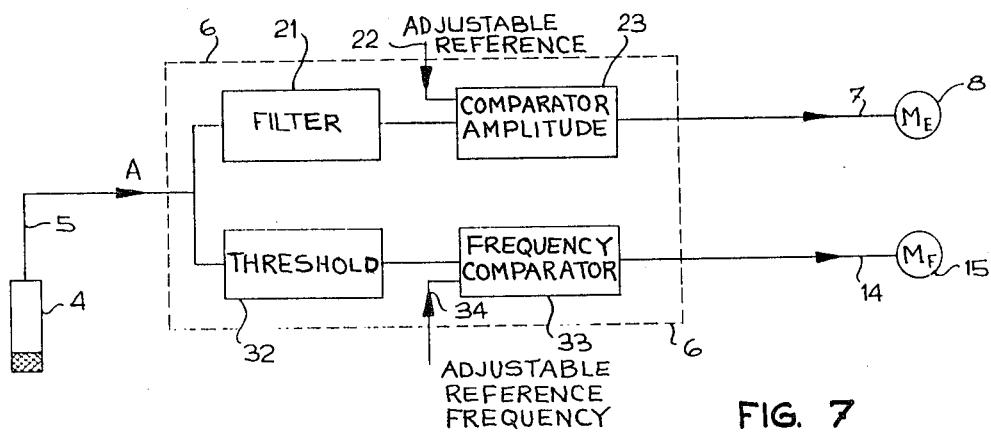
FIG. 7 is a diagram of an electrical control circuit used in the arc welding machine with metal wire feeding as shown on FIG. 3.

To carry out the method according to the invention, the device comprises a microphone 4 connected by a wire 5 to a control circuit 6 whose structure is shown in detail on FIG. 7. This control circuit comprises a filter 21 for filtering the acoustical signal detected at its fundamental frequency which is equal to the value of the frequency of modulation when the arc is operating under continuous current and to twice the value of the frequency of the current when the arc is operating under alternating current. The circuit 6 also comprises a comparator 23 for comparing the amplitude of the filtered acoustical signal to an adjustable reference amplitude corresponding to the desired length of the arc to determine the algebraic value of the difference and to produce an electrical continuous signal proportional to the algebraic value. The so produced, electrical signal is supplied via a wire 7 to a device 8 comprising a motor operating a plurality of rollers 9 for moving the electrode 2 with respect to the piece 3 to be welded until the actual length of the arc 1 is brought back to the desired value.

Simultaneously to the above-mentioned operation, each of the sounds made by the droplets of the metal fed by the wire 13 when they fall onto the piece 3 to be welded, is detected by the same microphone 4 via an electronic threshold 32. Then, the so detected frequency of the sounds or shocks made by the droplets falling onto the piece to be welded is compared to an adjustable reference frequency corresponding to the production of a given number of droplets to determine the algebraic value of their difference and to produce a continuous electrical signal proportional to this algebraic value of the difference between the measured frequency and the desired frequency of production of droplets. The electrical signal continuously produced by the frequency comparator 33 is then supplied via a wire 14 to a device 15 comprising a DC operated motor operating a plurality of rollers 16 to move the metal feeding wire with respect to the arc until the actual frequency of production of the droplets of metal corresponds to the desired frequency of production.

As can now be easily understood, the acoustic control device according to the invention can be used not only for controlling the length of the arc but also for controlling the deposition of additional metal fed by a wire. Indeed, the frequency of production of the droplets formed at the end of the metal feeding wire varies according to the operating conditions and produces sound at a frequency that can be used for adjusting the speed of feeding the wire.

Of course, the present invention is not restricted at all to the above-described preferred embodiments and may include further modifications within the scope of the following claims.

What is claimed is:

1. A method for controlling the length of an electrical arc generated in an arc generating machine, comprising the steps of:

a. detecting an acoustical signal generated by the electrical arc of said arc generating machine, said acoustical signal being directly proportional to the actual length of the arc and generating an electrical output signal in response to said detected signal:

b. subtracting from the amplitude of said electrical output signal a reference amplitude corresponding to the level of sound of a desired arc length, thereby producing an electrical difference signal proportional to the difference between the actual length and the desired length of the arc, said difference signal being positive if the arc is too long and negative if the arc is too short; and c. adjusting the length of said electrical arc by increasing said length if the difference signal is negative and reducing said length if the difference signal is positive until the difference signal is zero.

2. The method according to claim 1, wherein said arc generating machine is a gas-tungsten machine operating with a pulsed current, and wherein said method includes:

in step a. integrating each pulse of the detected signal to produce an integrated signal, dividing the integrated signal by a value proportional to the amplitude of the pulse, and producing said electrical output signal in response to the divided signal.

3. A method for controlling the length of an electrical arc generated in an arc generating machine, wherein said arc generating machine is an arc furnace supplied with a DC current, and further wherein said method comprises:

the preliminary step of slightly modulating said DC current supplied to said arc furnace;

step b. includes filtering the detected signal at its basic frequency which is equal to the frequency of modulation and producing said electrical output signal in response to the filtered signal; and step c. comprises supplying the difference signal to a device for moving the electrode of said arc furnace with respect to the bath of said arc furnace until the actual length of the arc is equal to the desired length.

4. A method for controlling the length of an electrical arc generated in an arc generating machine, comprising the steps of:

a. detecting an acoustical signal generated by the electrical arc of said arc generating machine, said acoustical signal being directly proportional to the actual length of the arc and generating an electrical output signal in response to said detected signal;

b. subtracting from the amplitude of said electrical output signal a reference amplitude corresponding to the level of sound of a desired arc length, thereby producing an electrical difference signal proportional to the difference between the actual length and the desired length of the arc, said difference signal being positive if the arc is too long and negative if the arc is too short;

c. adjusting the length of said electrical arc by increasing said length if the difference signal is negative and reducing said length if the difference signal is positive until the difference signal is zero wherein said arc generating machine is a three phase current arc furnace having three electrodes for producing three electrical arcs between said three electrodes and a bath, and wherein said method further comprises:

in step a. detecting said acoustical signal at a position equally distant from said three electrodes, and filtering the detected acoustical signal at a first frequency equal to six times the basic frequency of the three phase current, and generating said electrical output signal in response to said filtered signal;

in step c. supplying the difference signal simultaneously to three independent devices respectively associated with said three electrodes and simultaneously moving said three electrodes together with respect to said bath until the actual common length of the three arcs is equal to the desired length.

5. The method according to claim 4 and further comprising the steps of:

d. filtering the detected acoustical signal at a second frequency equal to twice the value of the basic frequency of the three phase current;

comparing the phase of the signal filtered at said second frequency to each of the phases of said three phase current to determine the algebraic value of the difference between the phase of the filtered signal and each of the phases of the three phase current and separately producing three continuous and distinct electrical resultant signals proportional to the respective algebraic values of the differences between the phase of the signals filtered at the second frequency and the phases of the three phase current; and supplying the separately produced electrical resultant signals to said three independent devices respectively associated with the three electrodes of the arc furnace and moving the three electrodes independently in response to the respective electrical signals until the length of each arc is equal to the lengths of the other arcs.

6. A method for controlling the length of an electrical arc generated in an arc generating machine, comprising the steps of:

a. detecting an acoustical signal generated by the electrical arc of said arc generating machine, said acoustical signal being directly proportional to the actual length of the arc and generating an electrical output signal in response to said detected signal;

b. subtracting from the amplitude of said electrical output signal a reference amplitude corresponding to the level of sound of a desired arc length, thereby producing an electrical difference signal proportional to the difference between the actual length and the desired length of the arc, said difference signal being positive if the arc is too long and negative if the arc is too short;

c. adjusting the length of said electrical arc by increasing said length if the difference signal is negative and reducing said length if the difference signal is positive until the difference signal is zero, wherein the arc generating machine is a gas-tungsten arc welding machine operating with a metal wire feeding device, and further including the steps of:

d. detecting with an electrical threshold device all of the sounds made by metal droplets falling from the wire fed by said metal wire feeding device onto the piece being welded;

e. comparing the frequency of the detected sounds to an adjustable reference corresponding to the production of a given number of droplets in order to determine the algebraic value of their difference and producing a continuous electrical signal proportional to said algebraic value; and f. supplying the continuous proportional electrical signal to a feed control for feeding metal wire from said metal wire feeding device until the actual frequency at which the droplets of metal are produced corresponds to the desired frequency.

7. A device for controlling the length of an electrical arc generated between two elements of an arc generating machine, comprising:

means for modulating the arc generating current;

means for detecting the acoustical signal generated by the arc, said acoustical signal being directly proportional to the actual length of the arc and for producing an output signal in response to said detected signal;

means for subtracting from the amplitude of said output signal a reference amplitude corresponding to the level of sound of a desired arc length thereby producing a difference signal proportional to the difference between the actual length and the desired length of the arc, said difference signal being positive if the arc is too long and negative if the arc is too short, and means for moving at least one element of said machine proportionally to said difference signal so as to increase or decrease the actual length of said arc, said moving means increasing the length of said arc if the difference signal is negative and reducing this length if the difference signal is positive, until said difference signal is equal to zero.

8. The device according to claim 7, wherein said means for detecting including means for filtering said detected signal at its basic frequency and producing said output signal in response to said filtered signal.

9. A device according to claim 7, wherein said arc generating machine is a gas-tungsten arc welding machine operating under a pulsed current, wherein said means for detecting includes means for integrating the amplitude of each pulse of said detected signal to produce an integrated signal, and means for dividing said integrated signal by a value proportional to the amplitude of each pulse for producing a divided signal and wherein said output signal is equal to said divided signal.

10. A method for controlling the length of an electrical arc generated in an arc generating machine, comprising the steps of:

a. detecting an acoustical signal generated by the electrical arc of said arc generating machine, said acoustical signal being directly proportional to the actual length of the arc and generating an electrical output signal in response to said detected signal;

b. subtracting from the amplitude of said electrical output signal a reference amplitude corresponding to the level of sound of a desired arc length, thereby producing an electrical difference signal proportional to the difference between the actual length and the desired length of the arc, said difference signal being positive if the arc is too long and negative if the arc is too short;

c. adjusting the length of said electrical arc by increasing said length if the difference signal is negative and reducing said length if the difference signal is positive until the difference signal is zero, wherein said arc generating machine includes three electrodes producing three electrical arcs in response to a three phase current, wherein said means for detecting is positioned equally distant from said three electrodes for producing an acoustical signal naturally generated by said three arcs, and further includes means for filtering said detected signal at a frequency equal to six times the basic frequency of said three phase current, and producing said output signal in response to said filtered signal; and wherein said means for moving said electrodes includes three independent means respectively associated with said three electrodes for simultaneously moving said electrodes together with respect to a bath until the actual common length of the three arcs is equal to the desired length.

11. A device according to claim 10 and further including:
means for filtering the detected acoustical signal at a second frequency equal to twice the value of the basic frequency of said three phase current;
means for comparing the phase of the signal filtered at the second frequency to each of the phases of the three phase current to determine the algebraic value of the difference between the phase of the filtered signal and each of the phases of the three phase current separately to produce three continuous and distince electrical signals proportional to the respective algebraic values of the differences between the phase of the filtered signal and the phases of the three phase current; and
means for supplying said separately produced electrical signals to said three independent means respectively associated with said three electrodes of said arc furnace so that each electrode will be moved separately from the other electrodes with respect to the bath until the length of each arc is equal to the length of the arcs of the other electrodes.

12. A device for controlling the length of an electrical arc generated between the electrode and a piece of metal to be welded in a gas-tungsten arc welding machine operating with additional metal wire feeding, said device comprising:
means for detecting an acoustical signal generated by an arc of said arc welding machine;
means for filtering the detected signal at its basic frequency;
means for comparing the amplitude of the filtered signal to an adjustable reference amplitude corresponding to a desired length of the electrical arc in order to determine the algebraic value of their difference and to produce a continuous electrical signal proportional thereto;
means responsive to said continuous electrical signal for moving the electrode with respect to the piece of metal to be welded until the actual length of said arc is equal to the desired length;
threshold means operating simultaneously with said filtering means for detecting all of the noises made by metal droplets falling from said metal wire onto said piece to welded;
additional means for comparing the frequency of said detected noises to an adjustable reference frequency corresponding to a given number of droplets in order to determine the algebraic value of their difference and to produce a continuous electrical signal proportional thereto; and
additional means responsive to said continuous electrical signal produced by said additional comparing means for moving the metal wire with respect to the arc until the actual frequency of said droplets of metal correspond to said desired frequency.

13. A device according to claim 12 further including means for supplying said arc welding machine with a DC current and means for slightly modulating said DC current, and wherein said basic frequency is equal to the frequency of modulation.

14. A device according to claim 12 further including means for supplying said arc welding machine with an AC current, and wherein said basic frequency is equal to twice the frequency of said AC current.

* * * * *